April 14, 1925.  1,533,539
H. P. CLEVELAND
METHOD OF UNITING PIECES OF CERTAIN ALLOYS TO ONE ANOTHER OR TO OTHER
METALS OR ALLOYS, A FLUX FOR USE THEREIN, AND THE PRODUCT THEREOF
Filed Aug. 2, 1921
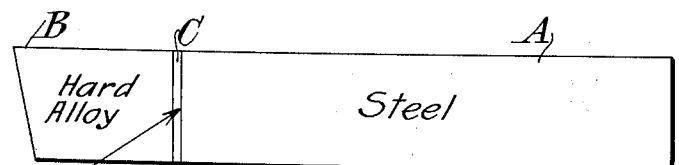
Brazed with Brass.
Flux- Borax- Boric Acid - Fluorine Compound.
Inventor:
Henry Prentiss Cleveland,
By Attorneys,
Fraser, Turk & Myers Patented Apr. 14, 1925.

1,533,539

UNITED STATES PATENT OFFICE.

HENRY PRENTISS CLEVELAND, OF NEW YORK, N. Y.

METHOD OF UNITING PIECES OF CERTAIN ALLOYS TO ONE ANOTHER OR TO OTHER METALS OR ALLOYS, A FLUX FOR USE THEREIN, AND THE PRODUCT THEREOF.

Application filed August 2, 1921. Serial No. 489,161.

*To all whom it may concern:*

Be it known that I, HENRY PRENTISS CLEVELAND, a citizen of the United States of America, residing in the borough of Manhattan, city, county, and State of New York, have invented certain new and useful Improvements in Methods of uniting pieces of certain alloys to one another or to other metals or alloys, a flux for use therein, and the product thereof, of which the following is a specification.

This invention relates to a process or method of uniting pieces of certain alloys to one another or to other metals or alloys a product of such method, and a flux or compound used in such method.

The invention provides a method whereby alloys, especially alloys having an inherent temper such as alloys of chromium and cobalt, together with another metal such as tungsten, molybdenum, etc., commercially known as "Stellite" may be securely united to pieces of the same alloy, or to other metals or alloys particularly steel, bronze or brass and in such manner as to undergo no deterioration in the process of union, the union being effected by brazing with brass and making use of a flux containing a fluorine compound.

The invention further provides a novel flux or compound for use in brazing alloys such as set forth above, to other pieces of the same or a similar alloy, or to other metals or alloys.

The invention further provides a novel product or article, and particularly a metal cutting tool, comprised of one or more pieces of an alloy such as set out above united to one another or to another metal or alloy, in which the parts are securely united by brazing with brass, and in which the properties of the alloy are unaffected by heat such as would be employed in welding or copper brazing.

A drawing illustrating a tool formed according to the present process, and also serving to illustrate the process, is annexed.

To unite a bit or piece of an alloy such as referred to above to another piece of the same or a similar alloy or to a piece or stock of another metal or alloy, steel, bronze or brass in particular, pieces of the desired shape and size are taken, and a flux or compound, according to the present invention is applied to the alloy, or to that part of the alloy which is to be directly joined to the stock, or to both pieces to be united preferably in the form of a paste.

The flux contains a fluorine compound as the essential ingredient, and preferably also boric acid. Borax or borax glass improves the action of the flux, and is also preferably an ingredient. An available and satisfactory fluorine compound to use is fluorspar or its purified product calcium fluoride.

The fluorine compound, boric acid and borax are preferably mixed in substantially the following proportions (by weight):

| | Parts. |
|---|---|
| Calcium fluoride | 1 |
| Boric acid | 3½ |
| Borax | 2½ |

Sufficient water is preferably added to form a paste.

The bit with the flux and the stock are then brought together and brazed with brass. Under the term brass may be included various alloys of copper, such as bronze, gun metal, silver solder, etc., the important consideration being that it shall have a melting point low enough that the alloy will not be injuriously affected or "burnt" during the brazing. As an indication of an injurious temperature, it may be stated that the use of temperatures such as are used in brazing with copper, having a melting point of about 1100° C.–2012° F., injuriously affect the alloy. Ordinary brazing brass is, however, preferably used. By the use of brass, however, brasses of relatively low melting point may be used, with corresponding lower temperatures required for effecting the brazing. The brazing heat may be applied with a torch or by an oven or furnace.

The joint between the alloy piece or bit and the piece or stock of the same or a similar alloy, or with another metal or alloy is firm and secure and does not part under severe use or strains. Moreover the alloy has not been found to have deteriorated or become "burnt" when united to the stock according to the present process.

The methods heretofore found best suited to uniting the alloy bits to stocks have been welding or copper brazing, but the experience has been that an insecure and an uncertain union or joint has been made, resulting in a large percentage of discards in manufacture and failures in use, and further that the alloy does not have the same quality after heating as it had in its original condition after being cast. The alloy is not one the temper of which can be restored after being lost or impaired, and hence its quality cannot be restored by treatment, as is the case with "high speed steels," so called.

On the accompanying drawing showing a cutting tool with an alloy bit, A designates the stock, usually of steel, B the alloy bit, and C the joint formed by brazing with brass, and using the flux herein described.

The inventive ideas may receive other embodiments or be carried out in other particular modes than those herein specifically illustrated and described.

What is claimed is:

1. A method of uniting one or more pieces of a chromium, cobalt alloy, or the like, to one another or to other metals or alloys, comprising applying a flux containing a fluorine compound and brazing the parts together with brass.

2. A method of uniting one or more pieces of a chromium, cobalt alloy, or the like, to one another or to other metals or alloys, comprising applying a flux containing a fluoride and brazing the parts together with brass.

3. A method of uniting one or more pieces of a chromium, cobalt alloy, or the like, to one another or to other metals or alloys, comprising applying a flux containing calcium fluoride and brazing the parts together with brass.

4. A method of uniting one or more pieces of a chromium, cobalt alloy, or the like, to one another or to other metals or alloys, comprising applying a flux containing boric acid and a fluorine compound and brazing the parts together with brass.

5. A method of uniting one or more pieces of a chromium, cobalt alloy, or the like, to one another or to other metals or alloys, comprising applying a flux containing borax, boric acid and a fluorine compound and brazing the parts together with brass.

6. A method of uniting one or more pieces of a chromium, cobalt alloy, or the like, to one another or to other metals or alloys, comprising applying a flux containing borax, boric acid and a fluorine compound and brazing the parts together with brass, said parts of the flux being substantially in the proportion of two and one-half parts of borax, three and one-half parts of boric acid and one part of a fluorine compound such as calcium fluoride, all by weight.

7. A method of uniting one or more pieces of a chromium, cobalt alloy, or the like, to one another or to other metals or alloys, comprising applying a flux containing borax, boric acid and a fluoride and brazing the parts together with brass, said parts of the flux being substantially in the proportion of two and one-half parts of borax, three and one-half parts of boric acid and one part of a fluorine compound such as calcium fluoride, all by weight.

8. A flux or compound for use in brazing one or more pieces of a chromium, cobalt alloy, or the like, to one another, or to other metals or alloys, comprising a fluorine compound and boric acid.

9. A flux or compound for use in brazing one or more pieces of a chromium, cobalt alloy, or the like, to one another, or to other metals or alloys, comprising a fluorine compound, boric acid, and borax.

10. A flux or compound for use in brazing one or more pieces of a chromium, cobalt alloy, or the like, to one another, or to other metals or alloys, comprising a fluorine compound, boric acid and borax, said ingredients being substantially in the proportion of two and one-half parts of borax, three and one-half parts of boric acid and one part of a fluorine compound such as calcium fluoride, all by weight.

In witness whereof, I have hereunto signed my name.

HENRY PRENTISS CLEVELAND.